(12) United States Patent
Charbit et al.

(10) Patent No.: US 8,374,212 B2
(45) Date of Patent: Feb. 12, 2013

(54) FREQUENCY HOPPING IN LICENSE-EXEMPT/SHARED BANDS

(75) Inventors: Gilles Charbit, Farnborough (GB); Tao Chen, Salo (FI)

(73) Assignee: Renesas Mobile Corporation, Tokyo (JP)

(*) Notice: Subject to any disclaimer, the term of this patent is extended or adjusted under 35 U.S.C. 154(b) by 0 days.

(21) Appl. No.: 13/274,800

(22) Filed: Oct. 17, 2011

(65) Prior Publication Data

US 2012/0307869 A1 Dec. 6, 2012

Related U.S. Application Data

(63) Continuation of application No. 13/151,557, filed on Jun. 2, 2011.

(30) Foreign Application Priority Data

Jun. 2, 2011 (GB) .................................. 1109289.7

(51) Int. Cl.
*H04B 1/00* (2006.01)

(52) U.S. Cl. ...................................... 375/132

(58) Field of Classification Search .................. 370/338, 370/331; 455/436, 426.1, 426.2
See application file for complete search history.

(56) References Cited

U.S. PATENT DOCUMENTS

| | | | | |
|---|---|---|---|---|
| 5,870,385 A * | 2/1999 | Ahmadi et al. | ............... | 370/252 |
| 6,031,863 A * | 2/2000 | Jusa et al. | ...................... | 375/132 |
| 6,278,723 B1 * | 8/2001 | Meihofer et al. | ............. | 375/133 |
| 6,731,669 B1 * | 5/2004 | Kudoh et al. | ................ | 375/133 |
| 6,882,677 B2 * | 4/2005 | Dehner et al. | ................ | 375/132 |
| 7,551,591 B2 * | 6/2009 | Erlich et al. | .................. | 370/338 |
| 7,668,128 B1 * | 2/2010 | Benveniste | .................... | 370/311 |
| 7,957,350 B2 * | 6/2011 | Oulai et al. | ................... | 370/332 |
| 7,965,681 B2 * | 6/2011 | Berglund et al. | ............. | 370/329 |
| 7,965,786 B2 * | 6/2011 | Hu et al. | ........................ | 375/267 |
| 8,027,687 B2 * | 9/2011 | Jung et al. | ..................... | 455/450 |
| 8,064,403 B2 * | 11/2011 | Zhao et al. | .................... | 370/331 |
| 8,090,371 B2 * | 1/2012 | Gallagher et al. | ............ | 455/436 |
| 8,130,718 B2 * | 3/2012 | Shaheen | ........................ | 370/331 |
| 2002/0085622 A1 * | 7/2002 | Dhar et al. | .................... | 375/132 |

(Continued)

FOREIGN PATENT DOCUMENTS

EP 2 306 782 A1 4/2011
WO WO 2011/062439 A2 5/2011

OTHER PUBLICATIONS

"Time synchronization requirements for different LTE-A techniques", Qualcomm Europe, 3GPP TSG-RAN WG1 #58bis, R1-094321, Oct. 2009, 6 pgs.

(Continued)

*Primary Examiner* — David C. Payne
*Assistant Examiner* — Bahman Badipour
(74) *Attorney, Agent, or Firm* — Harrington & Smith (57) ABSTRACT

RRC signaling is used to configure a user device for N secondary cells SCells on license-exempt channels $w_i$ in a frequency hopping channel set $W=\{w_i\}$ where i=1, 2, . . . N. Then cross-carrier scheduling is sent on a primary cell PCell to schedule a frequency hopping FH resource block $h_i$ on the $i^{th}$ license-exempt channel $w_i$. Based on measurements of at least some of the license-exempt channels $w_i$ received from at least the user device, parameters for the frequency hopping are adapted. The FH resource block contains M physical resource blocks, scheduled for the SCell during a FH time interval $T_{u*L+j}$ by a resource grant sent on a PDCCH of the PCell. In an embodiment the RRC signaling is sent by a micro access node/HeNB on the PCell, the cross carrier scheduling is sent also by the micro access node/HeNB on the PCell, and the PCell lies within an LTE licensed frequency band.

21 Claims, 6 Drawing Sheets

U.S. PATENT DOCUMENTS

| | | | |
|---|---|---|---|
| 2002/0186710 A1* | 12/2002 | Alvesalo et al. | 370/468 |
| 2005/0272432 A1* | 12/2005 | Ji et al. | 455/449 |
| 2006/0078039 A1* | 4/2006 | Dhar et al. | 375/132 |
| 2006/0148482 A1* | 7/2006 | Mangold | 455/450 |
| 2007/0064770 A1* | 3/2007 | Horiguchi | 375/133 |
| 2007/0237121 A1* | 10/2007 | Khandelwal et al. | 370/338 |
| 2007/0243839 A1* | 10/2007 | Kostic | 455/132 |
| 2008/0013599 A1* | 1/2008 | Malladi | 375/132 |
| 2008/0220787 A1* | 9/2008 | Stanwood et al. | 455/450 |
| 2008/0248822 A1* | 10/2008 | Jarvinen et al. | 455/509 |
| 2009/0106810 A1* | 4/2009 | Stoye et al. | 725/131 |
| 2009/0285165 A1* | 11/2009 | Berglund et al. | 370/329 |
| 2009/0305699 A1* | 12/2009 | Deshpande et al. | 455/434 |
| 2009/0316758 A1* | 12/2009 | Ahn et al. | 375/135 |
| 2010/0048212 A1 | 2/2010 | Yavuz et al. | 455/436 |
| 2010/0061326 A1* | 3/2010 | Lee et al. | 370/329 |
| 2010/0159940 A1* | 6/2010 | Gorokhov et al. | 455/450 |
| 2010/0215011 A1* | 8/2010 | Pan et al. | 370/329 |
| 2010/0329200 A1* | 12/2010 | Chen et al. | 370/329 |
| 2011/0007779 A1* | 1/2011 | Nanri | 375/133 |
| 2011/0044259 A1 | 2/2011 | Nimbalker et al. | 370/329 |
| 2011/0075759 A1* | 3/2011 | Seok | 375/295 |
| 2011/0090939 A1* | 4/2011 | Diener et al. | 375/136 |
| 2011/0103317 A1* | 5/2011 | Ribeiro et al. | 370/329 |
| 2011/0134774 A1* | 6/2011 | Pelletier et al. | 370/252 |
| 2011/0164584 A1* | 7/2011 | Seo et al. | 370/329 |
| 2011/0170499 A1* | 7/2011 | Nayeb Nazar et al. | 370/329 |
| 2011/0230219 A1* | 9/2011 | Shores et al. | 455/507 |
| 2011/0243047 A1* | 10/2011 | Dayal et al. | 370/311 |
| 2011/0255425 A1* | 10/2011 | Pikkarainen et al. | 370/252 |
| 2011/0258327 A1* | 10/2011 | Phan et al. | 709/227 |
| 2011/0286408 A1* | 11/2011 | Flore et al. | 370/329 |
| 2012/0009923 A1* | 1/2012 | Chen et al. | 455/434 |
| 2012/0026941 A1* | 2/2012 | Ahmad et al. | 370/328 |
| 2012/0039275 A1* | 2/2012 | Chen et al. | 370/329 |
| 2012/0044921 A1* | 2/2012 | Chung et al. | 370/338 |
| 2012/0051306 A1* | 3/2012 | Chung et al. | 370/329 |
| 2012/0076081 A1* | 3/2012 | Merlin et al. | 370/329 |
| 2012/0076091 A1* | 3/2012 | Seok | 370/329 |
| 2012/0082047 A1* | 4/2012 | Wu | 370/252 |

OTHER PUBLICATIONS

"On Frequency Hopping for Aperiodic SRS Transmission", Texas Instruments, 3GPP TSG RAN WG1 #64, R1-110699, Feb. 2011, 3 pgs.

$3^{rd}$ Generation Partnership Project; Technical Specification Group Radio Access Network; Evolved Universal Terrestrial Radio Access (E-UTRA); Physical Channels and Modulation (Release 9), 3GPP TS 36.211 V9.1.0, Mar. 2010, 85 pgs.

"Frequency Hopping Spread Spectrum (FHSS) vs. Direct Sequence Spread Spectrum (DSSS) in Broadband Wireless Access (BWA) and Wireless LAN (WLAN)", Sorin M. Schwartz, http:www//sorin-schwartz.com/white_papers/fhvsds.pdf, undated, 16 pgs.

"11af Coexistence Assurance Document", IEEEP802.11 Wireless LANs, Jan. 2011, 4 pgs.

"New Work Item Proposal: Enhanced ICIC for non-CA based deployments of heterogeneous networks for LTE", CMCC, 3GPP TSG RAN#47, RP-100383, Mar. 2010, 6 pgs.

"Time synchronization requirements for different LTE-A techniques", Qualcomm Europe, 3GPP TSG-RAN WGI #58bis, R1-094231, Oct. 2009, 6 pgs.

"On Frequency Hopping for Aperiodic SRS Transmission", Texas Instruments, 3GPP TSG RAN WG1 #64 R1-110699, Feb. 2011, 3 pgs.

"Work Item Description: Carrier Aggregation for LTE", Nokia Corporation, 3GPP TSG RAN #46, RP-091440, Dec. 2009, 6 pgs.

"Avoiding interference in the 2.4GHZ ISM band", Ryan Winfield Woodings, 3 pgs.

"Fundamentals of Dynamic Frequency Hopping in Cellular Systems", Zoran Kostic et al., IEEE Journal on Selected Areas in Communications, vol. 19, No. 11, Nov. 2001, 13 pgs.

$3^{rd}$ Generation Partnership Project; Technical Specification Group Radio Access Network; Evolved Universal Terrestrial Radio Access (E-UTRA); Physical Channels and Modulation (Release 9), 3GPP TS 36.211 V9.1.0, Mar. 2010, 85 pgs.

"Second Memorandum Opinion and Order, In the Matter of Unlicensed Operation in the TV Broadcast Bands", Federal Communications Commission FCC 10-174, Sep. 23, 2010, 101 pgs.

"Frequency Hopping Spread Spectrum (FHSS) vs. Direct Sequence Spread Spectrum (DSSS) in Broadband Wireless Access (BWA) and Wireless Lan (WLAN)", Sorin M. Schwartz, http:www//sorin-schwartz.com/white_papersaysds.pdf, undated, 16 pgs.

Xinsheng Zhao et al: "A cognitive based spectrum sharing scheme for LTE advanced systems", Ultra Modern Telecommunications and Control Systems and Workshops (ICUMT), 2010 International Congress on, IEEE, Piscataway, NJ, USA, Oct. 18, 2010, pp. 965-969.

Muhammad Imadur Rahman et al: "License-exempt LTE systems for secondary spectrum usage: Scenarios and first assessment", IEEE International Symposium on New Frontiers in Dynamic Spectrum Access Networks; (AACHEN): May 3-6, 2011 Dyspan; May 3-6, 2011, Piscataway, NJ, May 3, 2011, pp. 349-358.

* cited by examiner

FREQUENCY HOPPING IN LICENSE-EXEMPT/SHARED BANDS

CROSS REFERENCE TO RELATED APPLICATION

This application is a continuation application under 35 USC §120 and 37 CFR 1.53(b) of co-pending U.S. patent application Ser. No. 13/151,557 filed on Jun. 2, 2011; and this application further claims benefit under 35 U.S.C. §119(a) and 37 CFR 1.55 to UK Patent Application GB 1109289.7, filed on Jun. 2, 2011.

FIELD OF THE INVENTION

The exemplary and non-limiting embodiments of this invention relate generally to wireless communication systems, methods, devices and computer programs, and more specifically relate to frequency hopping in unlicensed radio spectrum/bands.

BACKGROUND OF THE INVENTION

The following abbreviations that may be found in the specification and/or the drawing figures are defined as follows:

| | |
|---|---|
| 3GPP | third generation partnership project |
| AP | access point |
| BCCH | broadcast channel |
| CA | carrier aggregation |
| CC | component carrier |
| CQI | channel quality information |
| DCA | dynamical channel allocation |
| DCH | dynamical frequency hopping |
| DL | downlink |
| E-UTRAN | evolved universal terrestrial radio access network |
| FH | frequency hopping |
| HARQ | hybrid automatic repeat request |
| HeNB | home eNB |
| IEEE | institute of electronics and electrical engineers |
| ISM | industrial, scientific, medical |
| L1 | layer 1 |
| LTE | long term evolution (E-UTRAN) |
| LTE-A | long term evolution advanced |
| MAC | medium access control |
| OFDM | orthogonal frequency division multiplexing |
| PCFICH | physical control format indicator channel |
| PCH | paging channel |
| PDCCH | physical downlink control channel |
| PHICH | physical HARQ indicator channel |
| PRB | physical resource block |
| PUCCH | physical uplink control channel |
| PCell | primary cell |
| P-SCH | primary synchronization channel |
| PHY | physical |
| RRC | radio resource control |
| SCell | secondary cell |
| SPS | semi-persistent scheduling |
| SRS | sounding reference signal |
| SS | search space |
| S-SCH | secondary-synchronization channel |
| STA | station |
| TDM | time-division multiplexing |
| TVBD | television band device |
| TVWS | television white space |
| UE | user equipment |
| UL | uplink |
| WLAN | wireless local area network |
| WiFi | wireless fidelity (IEEE 802.11) |

Figure 1A:
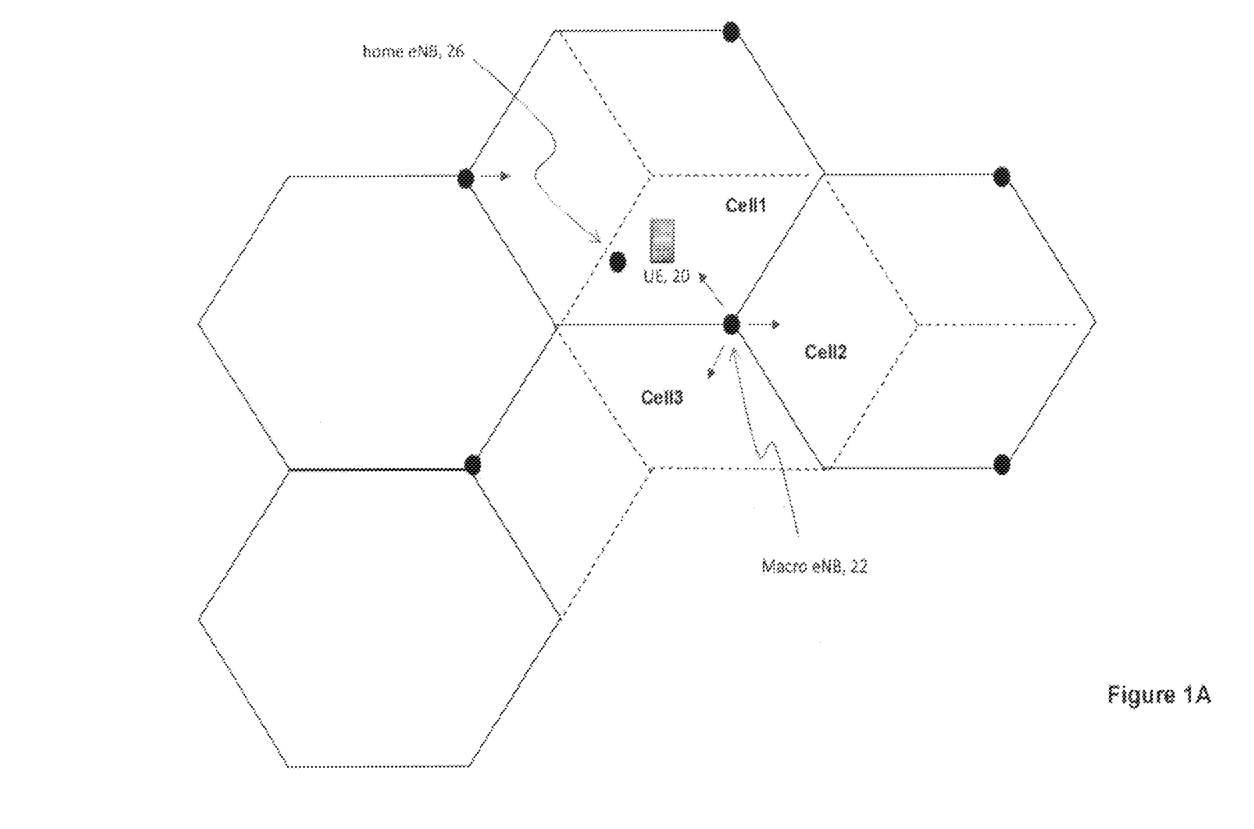
FIG. 1A illustrates a heterogeneous network in which a UE is in a region covered by a macro eNB and a home eNB, and is an exemplary environment in which embodiments of the invention may be practiced with advantage.

In the 3GPP LTE system there are to be heterogeneous networks made up of conventional macro eNBs operating in the same spectrum with home eNBs, micro eNBs and pico eNBs. FIG. 1A illustrates such a heterogeneous environment in which a UE 20 is operating at a location at which it can communicate with a macro eNB 22 and also with a home eNB 26. There may also be additional micro and/or pico cells in the same region. Whether or not the micro and pico eNBs are implemented as remote radio heads under control of the macro eNB, such a heterogeneous radio environment presents a challenging interference scenario. Mitigating this interference is now a work item in the 3GPP [see document RP-100383, entitled NEW WORK ITEM PROPOSAL: ENHANCED ICIC FOR NON-CA BASED DEPLOYMENTS OF HETEROGENEOUS NETWORKS FOR LTE; RAN#47; Vienna, Austria; 16-19 Mar. 2010]. Briefly, it shall consider techniques used in earlier releases (Release 8/9) and shall ensure backward compatibility for Release 8/9 terminals as well as minimize impact to the physical layer air interface.

There has also been research into 'offloading' traffic from licensed bands to unlicensed bands in such heterogeneous networks, to help prevent traffic bottlenecks in the conventional licensed bands. Unlicensed spectrum goes by several names such as license-exempt and shared bands, and by example include what is known as TV white spaces and the ISM bands (both 2.4 GHz under IEEE 802.11b and 802.11g; and 5 GHz under IEEE 802.11a). Interference may arise in the license-exempt bands due to devices operating in co-existing non-cellular systems, such as WiFi (IEEE 802.11), Zigbee (IEEE 802.15), Bluetooth, and USB wireless systems.

LTE cellular-traffic offloading to a license-exempt band is attractive for the increased bandwidth it offers, provided communications can be made reasonably reliable. To this end, the LTE eNB may be used to set up an LTE connection on the license-exempt band so as to retain control of the offloaded cellular-based traffic. But still there needs to be some solution to minimize interference between the LTE eNB and its device transmissions and any non-cellular devices in the license-exempt band, despite the fact that co-ordination with non-cellular systems on that license-exempt band may not be possible.

In the same vein, future deployments of LTE are to include carrier aggregation CA which might be utilized to help mitigate interference [see for example document RP-091440 entitled: CARRIER AGGREGATION FOR LTE, 3GPP RAN #46; Sanya, China; 1-4 Dec. 2009).

Figure 1B:
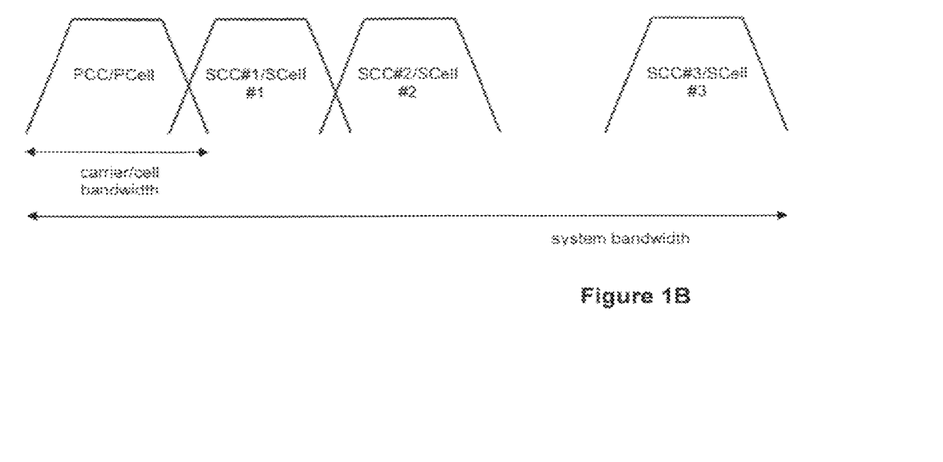
FIG. 1B is a schematic frequency diagram showing a carrier aggregation system in which some component carriers lay in a licensed band and some lay in unlicensed bands.

FIG. 1B illustrates the general CA concept for LTE/LTE-A. For a given UE there is assigned a PCell (alternatively termed a primary component carrier or PCC) which by example is backward-compatible with LTE Release 8/9 UEs (and therefore 20 MHz in bandwidth). That same UE may also have in its assigned set SCell#1, SCell#2 and SCell#3 (alternatively termed secondary component carriers SCCs), which for completeness SCell#3 is exemplarily shown as being non-contiguous in frequency with the other CCs, Any number of the SCells or none of them may be active for that UE at any given time, as coordinated with the macro eNB 22. Every UE 20 is to have its assigned PCell always active, and so the legacy UEs will be assigned one backward-compatible CC (e.g., its PCell) and no others. It is expected for 3GPP Release 11 (LTE-A) that there will be the capability for cross scheduling across Cells/CCs, and also that the different Cells/CCs may have different UL/DL configurations.

In some deployments, the macro eNB 22 of FIG. 1A may be operating on the PCell and one or more SCells while the HeNB 26 of FIG. 1A is operating on a different SCell as an interference mitigation scheme. Another scheme in IEEE 802.11af is to have the various devices contact a TVWS database to determine the primary systems (i.e. TV broadcasting) and then rely on Carrier Sensing Multiple Access/ Collision Avoidance (CSMA/CA) mechanisms to avoid inter-WiFi system interference [see for example document IEEE 802.11-11-0089r0 entitled 11AF COEXISTENCE ASSURANCE DOCUMENT, by Cisco Systems and Research In Motion, 19 Jan. 2011].

While these may be effective in some cases, and in fact may be used in combination with the teachings below, what is needed in the art is a way to offload traffic onto license-exempt bands in a manner that enables the licensed network/ eNB to maintain some control over the offloaded traffic and also to reasonably assure that the offloaded traffic will be reliably sent or received on the license-exempt band despite the network not having control over that band.

SUMMARY OF THE INVENTION

In a first exemplary aspect of the invention there is provided an apparatus for use in controlling an access node, the apparatus comprising a processing system, for example including at least one processor and a memory storing a set of computer instructions. In this embodiment the processing system is arranged to: utilize radio resource control signaling to configure a user device for N secondary cells on license-exempt channels $w_i$ in a frequency hopping channel set $W=\{w_i\}$ where i=1, 2, ... N (N is an integer at least equal to one); to utilize cross-carrier scheduling on a primary cell to schedule on at least one of the N secondary cells a frequency hopping resource block $h_i$ on the $i^{th}$ license-exempt channel $w_i$; and to adapt parameters for the frequency hopping based on measurements of at least some of the license-exempt channels $w_i$ received from at least the user device.

In a second exemplary aspect of the invention there is provided a method of controlling an access node, the method comprising: utilizing radio resource control signaling to configure a user device for N secondary cells on license-exempt channels $w_i$ in a frequency hopping channel set $W=\{w_i\}$ where in which N is an integer at least equal to one; utilizing cross-carrier scheduling on a primary cell to schedule on at least one of the N secondary cells a frequency hopping resource block $h_i$ on the $i^{th}$ license-exempt channel $w_i$; and adapting parameters for the frequency hopping based on measurements of at least some of the license-exempt channels $w_i$ received from at least the user device.

In a third exemplary aspect of the invention there is provided computer software adapted to perform the method of the second aspect of the invention.

In a fourth exemplary aspect of the invention there is provided a computer readable memory storing a set of instructions, which when executed by an apparatus for use in controlling an access node, causes the apparatus to: utilize radio resource control signaling to configure a user device for N secondary cells on license-exempt channels $w_i$ in a frequency hopping channel set $W=\{w_i\}$ where i=1, 2, ... N (N is an integer at least equal to one); utilize cross-carrier scheduling on a primary cell to schedule on at least one of the N secondary cells a frequency hopping resource block $h_i$ on the $i^{th}$ license-exempt channel $w_i$; and adapt parameters for the frequency hopping based on measurements of at least some of the license-exempt channels $w_i$ received from at least the user device.

In a fifth exemplary aspect of the invention there is provided apparatus substantially as herein described with reference to the accompanying drawings.

These and other embodiments and aspects are detailed below with particularity.

DETAILED DESCRIPTION OF THE INVENTION

Unlike segregating component carriers and CSMA/CA techniques noted in the background section above, embodiments of these teachings mitigate interference by frequency hopping. Of course, frequency hopping can be used in addition to CC segregation and/or CSMA/CA. The examples below are in the non-limiting context of an LTE system, and as will be detailed there the LTE transmissions use frequency agility to minimize interference to co-existing WiFi systems on license-exempt bands. The parameters of such transmission may be optimized based on measurements of co-existing WiFi system(s).

Frequency hopping has been used in GSM systems on the cellular band, including related concepts such as dynamic channel allocation (DCA) with FH pattern adaptation and dynamic frequency hopping using slow FH and modifying the utilized frequency-hop patterns based on rapid frequency quality measurements [see for example FUNDAMENTALS OF DYNAMIC FREQUENCY HOPPING IN CELLULAR SYSTEMS, by Zoran Kostic, Ivana Maric, and Xiaodong Wang; IEEE Journal on Selected Areas in Communications, vol. 19, No. 11; November 2001].

In the WLAN system (IEEE 802.11 series) there is FH on the physical layer in which the whole ISM band is divided for FH purposes into hopping channels of 1 MHz each with a fixed hopping time of 0.4 seconds. When hopping in this system, the hopping process is restricted to no longer than 224 µs per channel hop. This 802.11 FH scheme does not use any selective or intelligent hopping. See for example Frequency Hopping Spread Spectrum (FHSS) vs. Direct Sequence Spread Spectrum (DSSS) in Broadband Wireless Access (BWA) and Wireless LAN (WLAN) by Sorin M. Schwartz [see http:www//sorin-schwartz.com/white_papers/fhvsds.pdf, undated but last visited Apr. 29, 2011].

The examples below outline FH for an LTE system configured on the license-exempt band by LTE resources on the licensed band using CA mechanisms, which are of course beyond any specifications for GSM FH or WLAN FH.

Figure 1C:
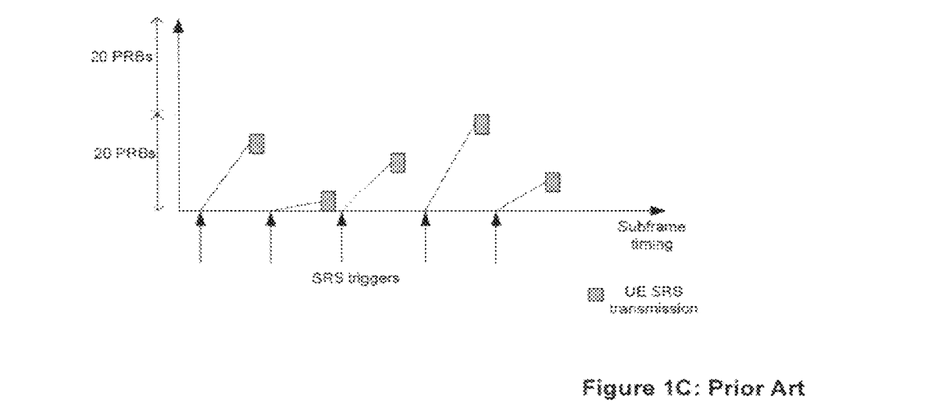
FIG. 1C is a schematic diagram of a frequency hopping approach under discussion for aperiodic sounding reference signals SRSs in which each transmission follows an individual hop in a pattern but is sent only when a separate SRS trigger is received.

Consider the prior art slot based FH, such as is specified in 3GPP Release 8 for the PUCCH to provides frequency diversity. Hopping takes place on the band edges, symmetrically over the center frequency. In addition, FH for aperiodic sounding reference signal (SRS) transmissions is now being discussed in 3GPP Release 10 [see document R1-110699 entitled: ON FREQUENCY HOPPING FOR APERIODIC SRS TRANSMISSION by Texas Instruments; RAN WG1 #64; 21-25 Feb. 2011] and two somewhat different methods are being considered. First, the LTE device SRS transmissions are hopped according to a predetermined pattern as illustrated at FIG. 1C, which is derived from the Release 8/9 hopping mechanism. In contrast to the Release 8/9 hopping scheme, each hop is activated by a separate SRS trigger, conveyed in a separate PDCCH. The LTE device hops to the next bandwidth part determined by the hopping pattern each time a trigger is received. In the second approach the LTE device sounds the hopping bandwidth based on a single trigger for a multi-shot duration. These FH techniques only apply to specific PUCCH or SRS signaling in LTE and do not consider FH mechanisms to set up a FH LTE system in any license-exempt bands.

Figure 2:
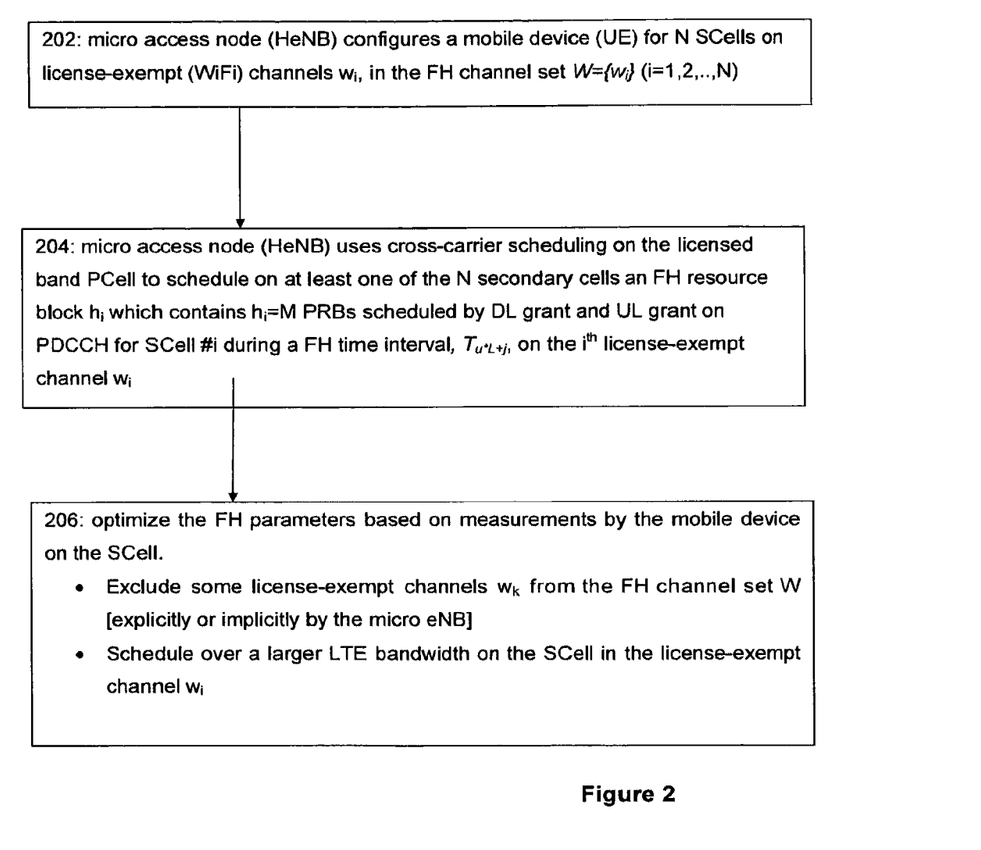
FIG. 2 is a logic flow diagram illustrating the operation of a method, and a result of execution by an apparatus of a set of computer program instructions embodied on a computer readable memory, in accordance with the exemplary embodiments of this invention.

As an overview in the exemplary but non-limiting context of the LTE system with HeNB deployments, embodiments of the invention include a setup procedure as shown at FIG. 2 for an LTE FH system in the license-exempt band in which LTE-band (licensed) resources are used to setup the initial FH LTE system configuration and for updating the parameters based on WiFi measurements on the license-exempt bands. It is reasonably assumed that use of the HeNBs, which have local low-powered LTE transmission on the license-exempt band, will minimize interference to various other WiFi Access Points (conventionally known as APs) and WiFi stations (conventionally known as non-AP STAs or simply STAs) operating on the same license-exempt bands. The macro eNB would likely interfere more extensively with APs and STAs in its cell range, given its high-powered wide-area DL transmissions and the UL transmissions it receives from mobile devices. Another assumption is that the LTE (licensed) band for the PCell and the license-exempt band for the SCell may not be frequency-adjacent to one another, which means that the mobile device with CA capability would need a dual-transceiver chain (i.e. one DL receiver/UL transmitter for the PCell, and one DL receiver/UL transmitter for the SCell).

FIG. 2 lists the highlights of this setup procedure. At block 202 the HeNB (or more generally the micro access node) configures via RRC signaling (licensed band) to the mobile device N SCells on WiFi channels (or more generally licensed-exempt channels) $w_i$, in the FH channel set, $W=\{w_i\}$, where $i=1, 2, \ldots, N$. In this case, the FH channel set size $N \leqq = K$, where K is the number of WiFi channels in the license exempt band. In this description, each variable i, j, u, L, N and K are each positive integers.

Once the mobile device/UE is configured for the license-exempt N SCells, then at block 204 the micro eNB (also referred to as Home eNB or HeNB for short) uses cross-carrier scheduling on the PCell (licensed band) to schedule on at least one of the N secondary cells an FH resource block, $h_i$ (of the FH resource block set, $H=\{h_i\}$) which contains FH resource block $h_i$=M Physical Resource Blocks (PRBs) scheduled by DL grant and UL grant on PDCCH for SCell #i during a FH time interval, $T_{u*L+j}$, on the $i^{th}$ WiFi channel $w_i$ (license-exempt band). In this case $L \leqq K$ is the number of FH time intervals per FH pattern, u indicates the $u^{th}$ FH pattern and j indicates the $j^{th}$ FH time interval within the FH pattern. The macro eNB, which controls the licensed band (the PCell), may allocate certain transmission opportunities to the HeNB for the DL signaling it is to conduct in the licensed band/PCell as represented by blocks 202 and 204. The below examples utilize the more specific term HeNB without loss of generality.

Cross-carrier scheduling has the advantage of not transmitting Layer 1 (L1) control signaling [which includes the physical control format indicator (PCFICH), the PDCCH, and the physical HARQ indicator channel (PHICH)] in the non-data region of the LTE subframe in the SCell on the license-exempt band. This minimizes interference to WiFi systems there.

Figure 3A:
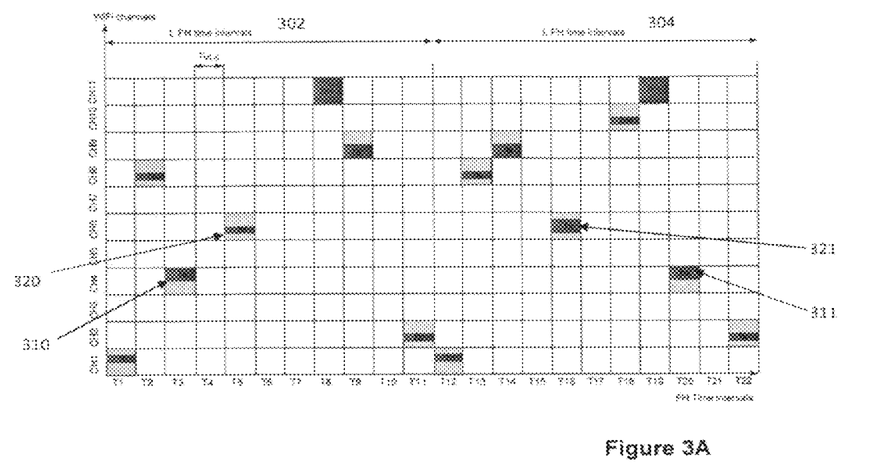
FIG. 3A is an exemplary but non-limiting frequency hopping diagram with license-exempt channels along the vertical axis and time intervals along the horizontal axis in which there are K=11 total channels in the license-exempt band and all are used in a pattern across L=11 time intervals.
Figure 3B:
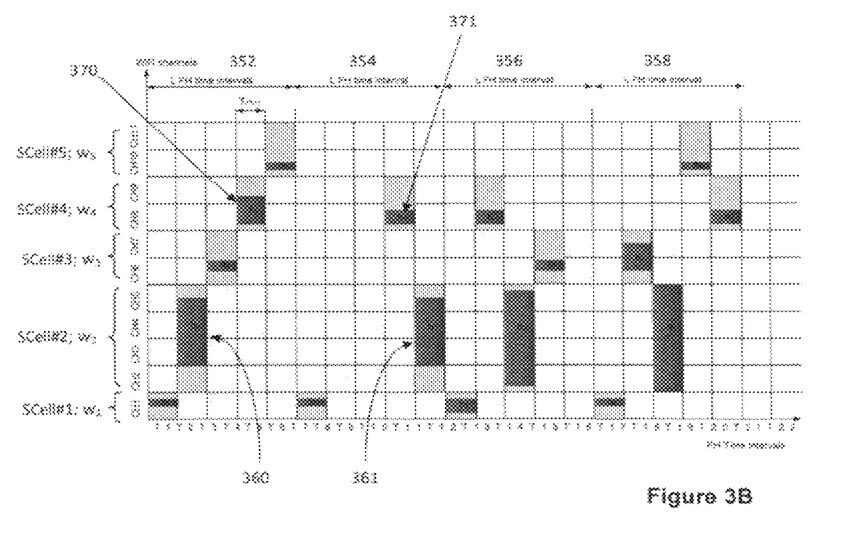
FIG. 3B is similar to FIG. 3A, but where L=5 and only N=5 of the K=11 total channels are used for the frequency hopping patterns.

Initially, the HeNB sets N SCells and M PRBs. Two variants are considered in examples shown below; namely N=K with each SCell occupying a WiFi channel as shown at FIG. 3A; and $N \leqq K$ with each SCell occupying one or a multiple of WiFi channels as shown at FIG. 3B.

Further for block 204, the FH timing interval may be indicated by RRC signaling as sfx, with sfx a multiple of LTE subframes or LTE radio frames. The cross-carrier scheduler in the HeNB may schedule DL and UL resources for SCell#i in FH WiFi channel, $w_i$, in all the subframes within the FH time interval, $T_{u*L+j}$, or in a subset of subframes, depending on the DL and UL traffic of devices on the SCell. Also, the FH channel set W may be activated and/or de-activated and re-configured via RRC signaling within a FH configuration time L*sfx (L multiplied by the FH timing interval).

The FH resource block H may be scheduled by the HeNB via MAC signaling with a dynamic scheduler. Whilst semi-persistent scheduling can only be used on the PCell in LTE Release 10, in the event it is allowed on an SCell in future releases then scheduling the FH resource block H via the HeNB's MAC signaling can also be realized by semi-persistent scheduling as opposed to only by dynamic scheduling.

Continuing on at FIG. 2, at block 206 the FH parameters may be optimized by the HeNB based on WiFi measurements by the mobile device on the SCell. For example, the FH parameters may be optimized in that:

Some WiFi channels $w_k$ may be excluded from the FH channel set W [i.e., $w_i$ in $W=\{w_i\}_{i \neq k}$] which means the number of WiFi channels $w_i$ in the FH channel set may become less than the number of WiFi channels in the license-exempt band (N<K). This may be done in two ways—
  i. Explicitly by the HeNB updating the FH channel set W for all the mobile devices configured on the SCells. This may arise where there are strong beacon signals from some nearby WiFi AP which are detected by many mobile devices and reported to the HeNB via RRC signaling or via some CQI reporting mechanism via MAC signaling;
  ii. Implicitly by the HeNB disabling use of some WiFi channel w, for some mobile devices based on their WiFi beacon-based measurements.

A larger LTE bandwidth on the SCell in the WiFi channel $w_i$ may be scheduled:
  i. if weak or no beacon signals from WiFi AP are detected, or
  ii. if there is good link quality based on Acknowledgement/Negative Acknowledgement of offloaded DL data sent by the HeNB to the mobile device on a PDSCH of the SCell as reported by the mobile device in an RRC_CONNECTED state. Hence, $h_i$=6, 7, . . . , 110 PRBs assuming LTE system bandwidth of up to 20 MHz can be used in the WiFi channel $w_i$.

FIGS. 3A and 3B give example embodiments of the above FH setup mechanisms, in which each row represents a different licensed-exempt channel $w_i$ and each column represents a different FH time interval $T_u$. These assume an IEEE WiFi 802.11b network in the ISM band in the United States, which has eleven 5 MHz WiFi channel numbers 1-11 in the center frequency 2-412 to 2.462 GHz. There are N SCells configured, with each cell occupying a fixed 5 MHz WiFi channel with the number of PRBs (M) allocated to the FH resource blocks $h_i$ being up to 25 PRBs.

FIG. 3A represents the case in which N (the FH channel set size) is less than K (the number of channels in the license-exempt band). FIG. 3A divides the columns into two groups of L FH time intervals, where L (the number of FH time intervals per FH pattern) is set to the total number of WiFi channels available on the ISM band (i.e. L=K=11 given the US-based 11-channel ISM band noted above). In the first L=11 FH time intervals 302 per FH pattern, the WiFi channel set with size N=7 is W={$w_1$, $w_2$, $w_4$, $w_6$, $w_8$, $W_9$, $W_{11}$} as indicated by the shaded blocks within those first L=11 FH time intervals 302. Data is scheduled on the FH resource block set H={$h_1$, $h_2$, $h_4$, $h_6$, $h_8$, $h_9$, $h_{11}$} in the FH time intervals $T_1$, $T_{11}$, $T_3$, $T_5$, $T_2$, $T_9$, $T_8$, respectively as indicated by the text within the shaded blocks of section 302 at FIG. 3A. This is a first FH pattern.

Further, in the second L=11 FH time intervals 304, the WiFi channel set with size N=8 is W={$w_1$, $w_2$, $w_4$, $w_6$, $w_8$, $w_9$, $W_{10}$, $W_{11}$} as indicated by the shaded blocks within those second L=11 FH time intervals 304. Similarly, data is scheduled on the FH resource block set H={$h_1$, $h_2$, $h_4$, $h_6$, $h_8$, $h_9$, $h_{10}$, $h_{11}$} in FH time intervals $T_{12}=T_{K+1}$, $T_{22}=T_{K+11}$, $T_{20}=T_{K+9}$, $T_{16}=T_{K+5}$, $T_{13}=T_{K+2}$, $T_{14}=T_{K+3}$, $T_{18}=T_{K+7}$, $T_{19}=T_{K+8}$, respectively as indicated by the text within the shaded blocks of section 304 at FIG. 3A. This is a second FH pattern.

In the example of FIG. 3A, there is no ordered mapping between FH resource blocks $h_i$ and the FH timing intervals $T_{u*L+j}$. this enables the FH patterns to be specific to HeNBs to minimize inter-cell interference between neighbor HeNB DL transmissions on the SCell. Assuming a UL grant is implicitly based on a DL grant, inter-device interference between mobile devices attached to different neighbor HeNBs will also be minimized when the FH patterns are HeNB-specific. Note that at reference number 310 the HeNB scheduled FH resource block $h_4$ in WiFi channel $w_4$ in $T_3$ in the first N FH time intervals, and then at reference number 311 scheduled it in $T_{K+9}$ in the second K FH time intervals. This is an example as noted with respect to FIG. 2 of the HeNB excluding some WiFi channels from the channel set based on the mobile devices' measurement reports.

Further, at reference number 320 the HeNB scheduled FH resource block $h_6$ in WiFi channel $w_6$ in $T_5$ with more PRBs in the second K FH time intervals than at reference number 321 in $T_{16}=T_{K+5}$ at the first K time intervals. The relatively larger number of PRBs is indicated by larger darker shared area, and is an example as noted with respect to FIG. 2 of the eNB optimizing the FH by using a larger bandwidth on the SCell in the WiFi channel.

Now consider the alternate example of the FH LTE setup at FIG. 3B, which also assumes the IEEE WiFi 802.11b network in the ISM band in the US in FIG. 3A. For FIG. 3B there are N=5 SCells configured, with each cell occupying one 5 MHz WiFi channel or a multiple of 5 MHz WiFi channels. Hence, SCell#1, SCell#2, SCell#3, SCell#4, and SCell#5 respectively occupy one 5 MHz WiFi channel, four 5 MHz WiFi channels, two 5 MHz WiFi channels, two 5 MHz WiFi channels, and two 5 MHz WiFi channels, as shown along the vertical axis of FIG. 3B. The number of PRBs (M) allocated to the FH resource blocks $h_i$ for SCell#1, SCell#2, SCell#3, SCell#4, and SCell#5 are respectively up to 25 PRBs, 100 PRBs, 50 PRBs, 50 PRBs, and 50 PRBs, since there are up to 25 PRBs per license-exempt channel.

FIG. 3B divides the columns into four groups of L FH time intervals, where L (the number of FH time intervals per FH pattern) is set to 5 and so FIG. 5B represents the case in which there are fewer FH time intervals per pattern than the total number of WiFi channels K available on the ISM band (5=L<K=11). In the first L FH time intervals represented by reference number 352, the WiFi channel set is size N=5 (there are 5 SCells despite that some are configured with multiple WiFi channels) and the FH channel set W={$w_1$, $w_2$, $w_3$, $w_4$, $w_5$}. Data is scheduled on FH resource block set H=$h_1$, $h_2$, $h_3$, $h_4$, $h_5$) in respective FH time intervals $T_1$, $T_2$, $T_3$, $T_4$, $T_5$ as shown at FIG. 3B.

Further, in the second L FH time intervals represented by reference number 354, the WiFi channel set is of size N=3 and includes W={$w_1$, $w_2$, $w_4$} with data scheduled on FH resource block set H={$h_1$, $h_2$, $h_4$,) in respective FH time intervals $T_6=T_{L+1}$, $T_{10}=T_{L+5}$, $T_9=T_{L+4}$ as shown at FIG. 3B.

The third (356) and fourth (358) L FH time intervals are similarly illustrated at FIG. 3B. For the third L FH time intervals represented by reference number 356, the WiFi channel set is size N=4 and the FH channel set W={$w_1$, $w_2$, $w_3$, $w_4$} with data scheduled on FH resource block set H={$h_1$, $h_2$, $h_3$, $h_4$) in respective FH time intervals $T_{11}=T_{2L+1}$, $T_{13}=T_{2L+3}$, $T_{14}=T_{2L+4}$, $T_{12}=T_{2L+2}$. For the fourth L FH time intervals represented by reference number 358, the WiFi channel set is size N=5 and the FH channel set W={$w_1$, $w_2$, $w_3$, $w_4$, $w_5$} with data scheduled on FH resource block set H={$h_1$, $h_2$, $h_3$, $h_4$, $h_5$) in respective FH time intervals $T_{16}=T_{3L+1}$, $T_{18}=T_{3L+3}$, $T_{17}=T_{3L+2}$, $T_{20}=T_{3L+5}$, $T_{19}=T_{3L+4}$.

In the FIG. 3B example, there is also no ordered mapping between FH resource blocks $h_i$ and the FH timing intervals $T_{u*L+j}$, as the FH patterns may be specific to HeNBs to minimize inter-cell interference between neighbor HeNB DL transmissions on a given SCell. Assuming the UL grant is implicitly based on the DL grant, inter-device interference between mobile devices attached to different neighbor HeNBs will also be minimized based on these FH patterns. Note that reference number 360 shows that the HeNB scheduled FH resource block $h_2$ in WiFi channel $w_2$ in $T_2$ in the first L FH time intervals 352, and then as shown by reference number 361 the HeNB scheduled it in $T_{L+5}$ in the second L FH time intervals 354 (and further in $T_{13}$ in the third L FH time intervals 356 and additionally in $T_{18}$ in the fourth L FH time intervals 358). This shows that the HeNB can exclude some channels from the FH channel set W so that the number N of channels in the FH channel set is less than the total number of channels K in the license-exempt band.

Further at FIG. 3B, reference number 370 shows that the HeNB scheduled FH resource block $h_4$ in WiFi channel $w_4$ in $T_4$ in the first L FH time intervals 352 with more PRBs than reference number 371 in $T_9=T_{L+4}$ in the second L time intervals 354. The larger number of PRBs is represented as a relatively larger area of darkened shading. This shows that a larger LTE bandwidth on an SCell in the WiFi channel may be scheduled, such as if no competing beacons (or only weak beacons) are present in the area or if there is good WiFi link quality as mentioned above with respect to FIG. 2.

FIGS. 3A-B above only show LTE carriers mapped to WiFi channels on the license-exempt band at 2.4 GHz via FH for simplicity. If we assume LTE frequency division duplex FDD SCell, then a DL SCell CC and a UL SCell CC will need to be mapped to separate WiFi channels. If those license-exempt channels are in the ISM band they will need to be at least 40 MHz apart; if they are in the TVWS band they need only be disjoint (non-contiguous in frequency).

In the United States, the ISM band at 5 GHz (802.11a) has channel numbers 36-64 which allows for up to 140 MHz bandwidth. This is a sufficient bandwidth to have both DL and UL CCs for FH LTE systems outlined in the examples above. For example, if we assume the UL CC is mapped to channel numbers 36-50 and the DL CC is mapped to channel numbers 51-64 with a usable bandwidth 50 MHz each respectively, there is sufficient headroom for a 40 MHz frequency gap between the UL and the DL CCs.

In the United States the TVWS bands are on channels 14-36 (470-608 MHz) and 38-51 (614-698 MHz), which have respective bandwidths of 138 MHz and 84 MHz. This also allows sufficient usable bandwidth and allows a 40 MHz frequency gap between the UL and the DL CCs.

If instead we assume an LTE time division duplex TDD SCell with the same TDD UL-DL subframe configuration in the PCell and in the SCell (and further assume half-duplex mobile devices), there will need to be a frequency gap of about 40 MHz between DL and UL in the SCell CC to allow more usable bandwidth. In this case the separation between DL and UL is done in time division multiplexing TDM fashion. In most cases it should be sufficient to have DL and UL in the SCell CCs for FH LTE systems as outlined in the examples above, in the ISM band at 2.4 GHz with a total usable bandwidth of 55 MHz (channels 1-11) and assuming TDD parameters.

However, in the case where different CC-specific TDD configurations are used for the PCell and the SCell with full-duplex devices, a frequency gap of about 40 MHz between the PCell CC and the SCell CC will be needed if it is further assume that simultaneous transmission and reception is allowed (i.e. a PCell subframe in the DL direction with a corresponding SCell subframe in the UL direction, or vice versa). This still allows a total usable bandwidth of 55 MHz for the SCell, assuming the PCell is on another (e.g., cellular/licensed) band.

Now are given further details of block 206 of FIG. 2, which notes that the FH parameters may be optimized based on measurement reports received from the mobile devices. Since the mobile devices are communicating on a LTE PCell and a WiFi SCell, it is reasonable to assume they are equipped with an LTE modem and a WiFi modem, and that the HeNB is aware that the mobile device has a WiFi modem as indicated during initial LTE cell access via higher layer signaling. The WiFi modem may be used to detect WiFi beacon frames transmitted by nearby WiFi Access Points APs. It is also reasonable to assume that both modems may access common memory address space in the mobile device to allow the LTE modem to read WiFi beacon-based measurements.

Since cross-carrier scheduling is being used, there is no PCFICH, PDCCH, or PHICH transmitted on the SCell as noted above; those channels are on the PCell and used for scheduling UL and DL radio resources on the SCell. This allows what is known in the art as almost-blank DL subframes to be sent on the PDSCH in case no data is scheduled there. Almost-blank subframes carry reference signals and in some cases also synchronization, paging, or system information, but never any unicast DL user data. They are used as an interference mitigation technique; the HeNB transmits its almost-blank subframes according to a known pattern and at those times the macro eNB can schedule its user devices which are operating in the area of the HeNB without the user device seeing excessive interference from the HeNB. The HeNBs also need to transmit other L1 signaling such as the primary/secondary-synchronization channels (P/S-SCH), the broadcast channel (BCCH) and the paging channel (PCH) in the middle six PRBs in the SCells to support standalone SCells with some impact on WiFi, as further analyzed below.

One of the ways the HeNB can optimize the FH parameters is by selecting or de-selecting which WiFi channels $w_i$ are to be in the WiFi channel set W. Some WiFi channels $w_k$ may be excluded from the FH channel set W; for example the HeNB can exclude $w_i$ in $W=\{w_i\}_{i \ne k}$ as was briefly mentioned in the discussion above concerning block 206 of FIG. 2. This allows optimization of the FH pattern time parameters. As discussed with reference to block 206 of FIG. 2, the HeNB may change the number of WiFi channels $w_i$ in the FH channel set pseudo-dynamically by the eNB in two ways:

explicitly with the HeNB updating the FH channel set W for all the devices configured on SCells (such as if there are multiple devices to detect and report strong beacon signals from a nearby WiFi AP; such reporting to the HeNB can be via RRC signaling, or via MAC signaling of CQI measurement reports adapted for this purpose);

implicitly with the HeNB disabling use of some WiFi channel w, for some devices based on their WiFi beacon-based measurements. These devices know that they will not be receiving any DL or UL grants on the corresponding SCell and hence can skip the DL subframes and UL subframes for these WiFi channels (i.e., they may go into a sleep mode during the FH timing interval corresponding to the disabled WiFi channels).

This WiFi beacon-based approach is a pro-active method in that it allows the eNB to vary the number of PRBs (M) allocated to a FH resource block ($h_i$) for a WiFi channel ($w_i$) based on some detected WiFi beacon signal strength level threshold (e.g., no beacon; weak beacon; and strong beacon ranges). It is reasonable to expect some delay in these WiFi measurements; assuming a typical beacon interval of 100 Time Units or 0.1 s, several beacon transmissions will likely be needed for the measurements. Adding in some further RRC signaling delay for reporting those measurements to the HeNB leaves a total delay on the order of a second or so for the HeNB to receive the WiFi measurements.

One exemplary embodiment to pro-actively reduce that delay is to utilize an LTE-modem in the license-exempt band using either (or some combination of) clear channel assessment/energy detection (CCA/ED) or clear channel assessment/preamble detection (CCA/PD) algorithms. By example, CCA/ED can be carried out anywhere within the physical layer convergence protocol (PLCP) frame or for that matter any frame type (control, management, data). CCA/PD algorithms detect the preamble sent at the beginning of the PLCP frame.

Also noted when introducing block 206 of FIG. 2 is that a larger LTE bandwidth may be scheduled on the SCell in the WiFi channel. This may be done by the HeNB changing the value of M, the number of PRBs assigned to a FH resource block $h_i$. The value of M PRBs assigned to a FH resource block $h_i$ on the SCell in a WiFi channel $w_i$ may be scheduled by the HeNB in two main ways in order to allow for optimizing the FH pattern frequency parameters:

- in case the device detects, using its WiFi modem, that there are only weak or no beacon signals from the WiFi AP. The device can then store the WiFi beacon-based measurements for the WiFi channel $w_i$ in a shared local memory within the device, from which the device's LTE modem can access in order to report the measurements to the HeNB.
- if there is good link quality based on Acknowledgment/Negative acknowledgement of offloaded DL data sent by the HeNB to the device on the PDSCH of the SCell. Such Acks/NAcks are reported by the device while the device is in the RRC_CONNECTED state.

The Ack/Nack approach above is more reactive in that it is based on ACK/NACK messages corresponding to the past transmissions on the specific frequencies. The HeNB can vary the number of PRBs (M) allocated to a FH resource block ($h_i$) for a WiFi channel ($w_i$) based on some Ack/Nack rate threshold (e.g., poor channel quality; average channel quality; and good channel quality). The Ack/Nack approach is faster since it does not require WiFi measurement reports and hence avoids the WiFi measurement delay that is quantified above. In addition, the Ack/Nack technique requires use of the WiFi modem only in the device, which saves battery power since the WiFi modem will only be needed during initial setup of the SCell on the license-exempt band for discovery of any neighboring WiFi APs.

Now referring to block 202 of FIG. 2, the HeNB configures the mobile devices for the SCell(s) in the license-exempt band through the use of PCell resources, which can also be used to activate frequency hopping as in the examples above. The LTE devices are attached to the PCell on the LTE (licensed) band and so RRC signaling by the HeNB to the UE on the PCell can be used to configure: component carriers for SCells and cross scheduler parameters; FH parameter configurations for the SCells; and activation of cross-carrier scheduling to begin the frequency hopping.

Figure 4:
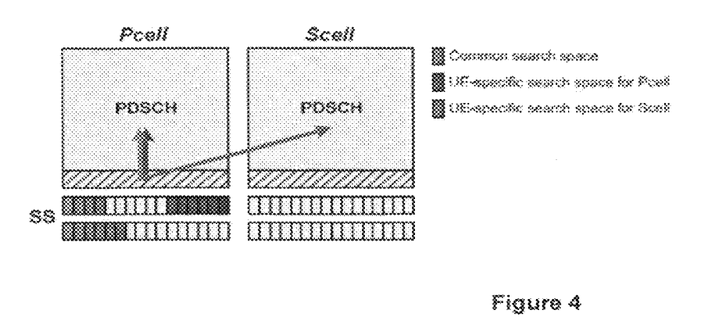
FIG. 4 is a schematic diagram illustrating cross scheduling on a SCell in the license-exempt band from a PDCCH sent on a PCell in the licensed band.

FIG. 4 is a schematic diagram of cross scheduling which illustrates how resources on the SCell are allocated from the PCell. First, there is configured SCell-specific search spaces (SS) on the PCell resources. The mobile devices then receive on the PCell from the HeNB their DL and UL grants for resources which lie on the SCells via the PDCCH addressed to specific mobile devices which they find in their SCell-specific search space.

Conventional LTE for CA (Release 10), 3GPP TS 36.213 v10.1.0 (March 2011) states that the PHICH is received from the same cell (or CC) which is used to send the UL grant. This means that in case cross-carrier scheduling is used, there is no PHICH on the SCell. If the mobile device/UE receives a PDCCH granting UL resources which lie on an SCell, and that PDCCH is sent on DL CC #x on the UE's PCell, the UE and the network will map to a PHICH from CC #x on the PCell several subframes later. PCFICH is also transmitted on the same cell (or CC) as the PDCCH.

Therefore, in conventional practice for the case of cross-carrier scheduling there is no L1 control signaling (PCFICH, PDCCH, PHICH) transmitted in the non-data region of the LTE subframe on the SCell. The non-data region in this case occupies all the PRBs due to the regular interleaving in the LTE Release-8 system bandwidth in the first 1-3 OFDM symbols, as indicated by the PCFICH on the PCell. Adapting the LTE Release-10 CA mechanisms, up to 13 OFDM symbols in the LTE subframe can be used for data transmission assuming only one (unused) OFDM symbol for L1 control signaling is used.

In an embodiment of these teachings, L1 signaling will also be used for synchronization, for system information, and for paging on the license-exempt band. The HeNBs may need to transmit other L1 signaling such as primary and secondary synchronization channel (P/S-SCH), broadcast channel (BCCH) and paging channel (PCH) in the middle six PRBs in the Scells in order to support standalone SCells; that is, to support mobile LTE devices which have the capability to operate in CA but not with extension carriers (CCs without a control channel region and which carry data channels only). Extension CCs are distinguished from standalone CCs below with reference to FIG. 5.

The LTE transmission power in the mid six PRBs in the license-exempt band (i.e. TVWS band or ISM band) must be within the regulated transmission power to avoid interfering with WiFi transmissions by other devices. Since the transmission of eNB L1 signaling over the middle six PRBs is over a relatively small bandwidth (i.e. 6 PRBs span about 1 MHz), it is not likely to cause significant interference on the WiFi channels which use a relatively larger system bandwidth (i.e. 22 MHz for 802.11b and 20 MHz for 802.11a).

Figure 5:
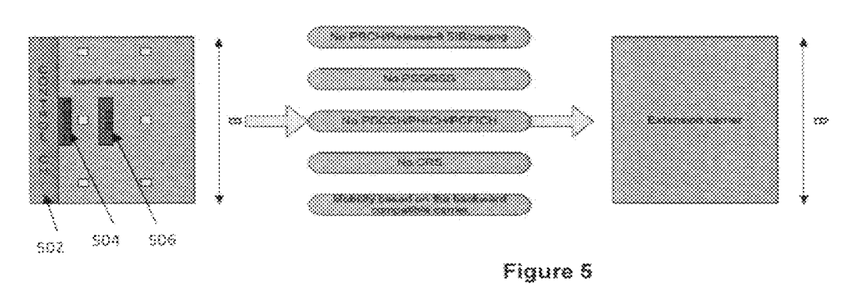
FIG. 5 is a schematic diagram illustrating differences between a standalone component carrier and an extension component carrier.

Such L1 signaling might be avoided by releasing the RRC connection or by using an extension carrier, but these are seen to be less desirable than retaining the L1 signaling. The RRC Connection can be released for all devices such as when there is a "busy" WiFi cell as detected by the device measurements on the SCell. But this would release the established radio bearers as well as all radio resources and assuming (reasonably) that there may be many APs within the SCell coverage area, all SCell CCs on "busy" WiFi channels will have to be released. FIG. 5 illustrates the distinction between a standalone and an extension CC. The extension CC only contains data as illustrated there, due to synchronization requirements assuming a non-adjacent (or large) LTE band for the PCell and license-exempt band for the SCell. On the contrary, the standalone carrier does have a control channel region 502 and so can carry the primary broadcast channel PBCH 504 and synchronization (P-SCH/S-SCH) 506. Further, the standalone CC can support mobility using its own control channel region 502 and can send common reference signals CRSs to the mobile devices, whereas mobility on the extension carrier must lie in another CC and no CRSs are exchanged in an extension carrier. This means that Release 8/9/10 devices without a CA capability can be supported on the license-exempt bands if the SCell is a standalone CC but not if the SCell were an extension carrier.

Without some aforethought there would likely be measurement gaps in the LTE Scell on the license-exempt band. For WiFi measurements done in DL subframes of the SCell, some interference from L1 signaling transmitted by the HeNB in the middle six PRBs can be expected because the HeNB transmits such L1 signaling continuously in the middle six PRBs. In the initial LTE system setup phase this is not an issue since the SCells are not yet setup, and devices may carry out WiFi measurements on the license-exempt band as the HeNB configures those devices via RRC signaling on the PCell.

After the initial setup phase, if the HeNB needs WiFi measurements from the user device on SCells, the HeNB can pseudo-dynamically adapt the FH time and frequency parameters (explicitly or implicitly as detailed above with respect to block 206 of FIG. 2). However, a solution is still needed to prevent such interference. To this end the HeNB may configure new blank DL subframes on the SCell to devices via RRC signaling (i.e., the HeNB stops transmitting data or signaling)

so as to allow WiFi beacon-based measurements by the WiFi modem in the user device without interference from the HeNB's own transmissions. This concept of "blank" subframes may be considered as a coordinated silencing between (macro and micro) eNB transmissions as an inter-cell interference management technique relying on Time-Division Multiplexing (TDM) of physical (PHY) channels or signals from different cells. See for example document R1-094231 entitled TIME SYNCHRONIZATION REQUIREMENTS FOR DIFFERENT LTE-A TECHNIQUES by Qualcomm Europe (3GPP TSG-RAN WG1 #58 bis; Miyazaki, Japan; 12-16 Oct. 2009).

Some of the issues involved in the "blank" subframe concept above are the impact on the legacy terminal measurements for handover and channel estimation in the user device. For the case that only LTE Release-11 and later user devices are supported on the license-exempt band, there would then be no legacy user terminal issues with the "blank" subframe. For the case that Release-8/9/10 terminals are also supported, the impact of the LTE HeNB middle six PRB interference on the device WiFi measurements may or may not need to be positively addressed. For example, in practice the interference may not be severe enough to warrant positive mitigation; WiFi signals are transmitted in a relatively larger system bandwidth (i.e. 22 MHz for 802.11b and 20 MHz for 802.11a) and so interference from the HeNB's middle six PRB transmissions (i.e. over about 1 MHz) may only partially interfere with a fraction of the WiFi measurements in the frequency domain. In this case it may be that the remainder of the WiFi signal is sufficient for the device to compile a measurement report which is comprehensive enough for the HeNB to properly adapt its FH parameters.

For WiFi measurements carried out in the DL subframes of the SCell, it is sufficient if the HeNB does not schedule any UL grant for the SCell which would create a measurement gap for the WiFi measurements in the SCell UL subframe on the license-exempt band. So in this case only the HeNB needs to take this into account when allocating to the device their UL and DL resources and there is no specific action the UE needs to do to avoid a measurement gap.

By employing the above techniques, the interference from the LTE system to the WiFi system on license-exempt shared bands can be minimized or otherwise mitigated via frequency agility/frequency hopping. It is also a distinct advantage that resources are flexibly allocated to devices on the license-exempt (shared) band via cross-carrier scheduling, based on user device WiFi measurements in that shared band.

So to summarize some of the above details and examples, there is a method, or an apparatus comprising a processing system, for example having at least one processor and a memory storing a set of computer instructions, which are configured to cause the apparatus to do the following.

As outlined at blocks 202, 204 and 206 of FIG. 2 which is from the perspective of the HeNB: utilize radio resource control RRC signaling to configure a user device for N secondary cells SCells on license-exempt channels $w_i$ in a frequency hopping FH channel set $W=\{w_i\}$ where i=1, 2, ... N and N is an integer at least equal to one; and to utilize cross-carrier scheduling on a primary cell PCell to schedule a frequency hopping FH resource block $h_i$ on the $i^{th}$ license-exempt channel $w_i$ on at least one of the N Scells; and to adapt parameters for the frequency hopping based on measurements of at least some of the license-exempt channels $w_i$ received from at least the user device.

Adding further detail to those broad concepts, above it was detailed that the frequency hopping resource block $h_i$ contains M physical resource blocks PRBs, scheduled for the (at least one) secondary cell SCell during a frequency hopping time interval $T_{u*L+j}$ by a downlink resource grant and an uplink resource grant sent on a physical downlink control channel PDCCH of the primary cell PCell, in which M is an integer at least equal to one, u identifies one pattern for the frequency hopping, and j indicates a $j^{th}$ frequency hopping time interval within the pattern.

In one exemplary embodiment, the RRC signaling to configure the N secondary cells on the license-exempt channels/license exempt band is sent by a HeNB (or more generally a micro access node) on the primary cell PCell, the cross carrier scheduling is also sent by the HeNB on the primary cell PCell, and the primary cell PCell lies within a licensed frequency band.

In another exemplary embodiment which may be combined with any of those above, there are a total of K license-exempt channels parsed into a frequency hopping channel set of size N; and further for the case that N=K, each SCell occupies only one of the license-exempt channels $w_i$; and for the case that N<K, at least one SCell occupies more than one of the license-exempt channels $w_i$.

In a still further exemplary embodiment, the RRC signaling further comprises an indication of a frequency hopping time interval T which is an integer multiple of subframes or radio frames used in the primary cell PCell.

In yet a further embodiment which may but need not be combined with those above, the measurements of at least some of the license-exempt channels $w_i$ received from at least the user device comprise measurement reports received via radio resource control signaling, and the parameters for the frequency hopping are adapted by changing a number M of PRBs allocated to an $i^{th}$ FH resource block $h_i$ based on whether the received measurement reports indicate a weak beacon, a strong beacon, or no beacon. Or in an alternative exemplary embodiment the measurements of at least some of the license-exempt channels $w_i$ received from at least the user device comprise acknowledgements/negative acknowledgements received via at least some of the license-exempt channels $w_i$, and the parameters for the frequency hopping are adapted by changing a number M of PRBs allocated to an $i^{th}$ FH resource block $h_i$ based on whether a rate of the received acknowledgements/negative acknowledgements indicate poor channel quality, good channel quality or average channel quality.

In another exemplary embodiment to be used in conjunction with either of the two immediately above, the parameters for the frequency hopping are adapted by changing the number of license-exempt channels $w_i$ in the frequency hopping channel set $W=\{w_i\}$ by explicitly updating the license-exempt channels $w_i$ in the frequency hopping channel set $W=\{w_i\}$ for all user devices configured on the (at least one) secondary cell. This is described above as useful for the case that multiple reports are received which indicate a strong beacon from another access point. In an alternative to this the parameters for the frequency hopping are adapted by changing the number of license-exempt channels $w_i$ in the frequency hopping channel set $W=\{w_i\}$ by implicitly disabling for the user device the $i^{th}$ license-exempt channel $w_i$ by not further scheduling uplink or downlink grants for the user device on the $i^{th}$ license-exempt channel $w_i$. This is detailed above as useful for the case that the user device reports a strong beacon on an $i^{th}$ license-exempt channel $w_i$.

Figure 6:
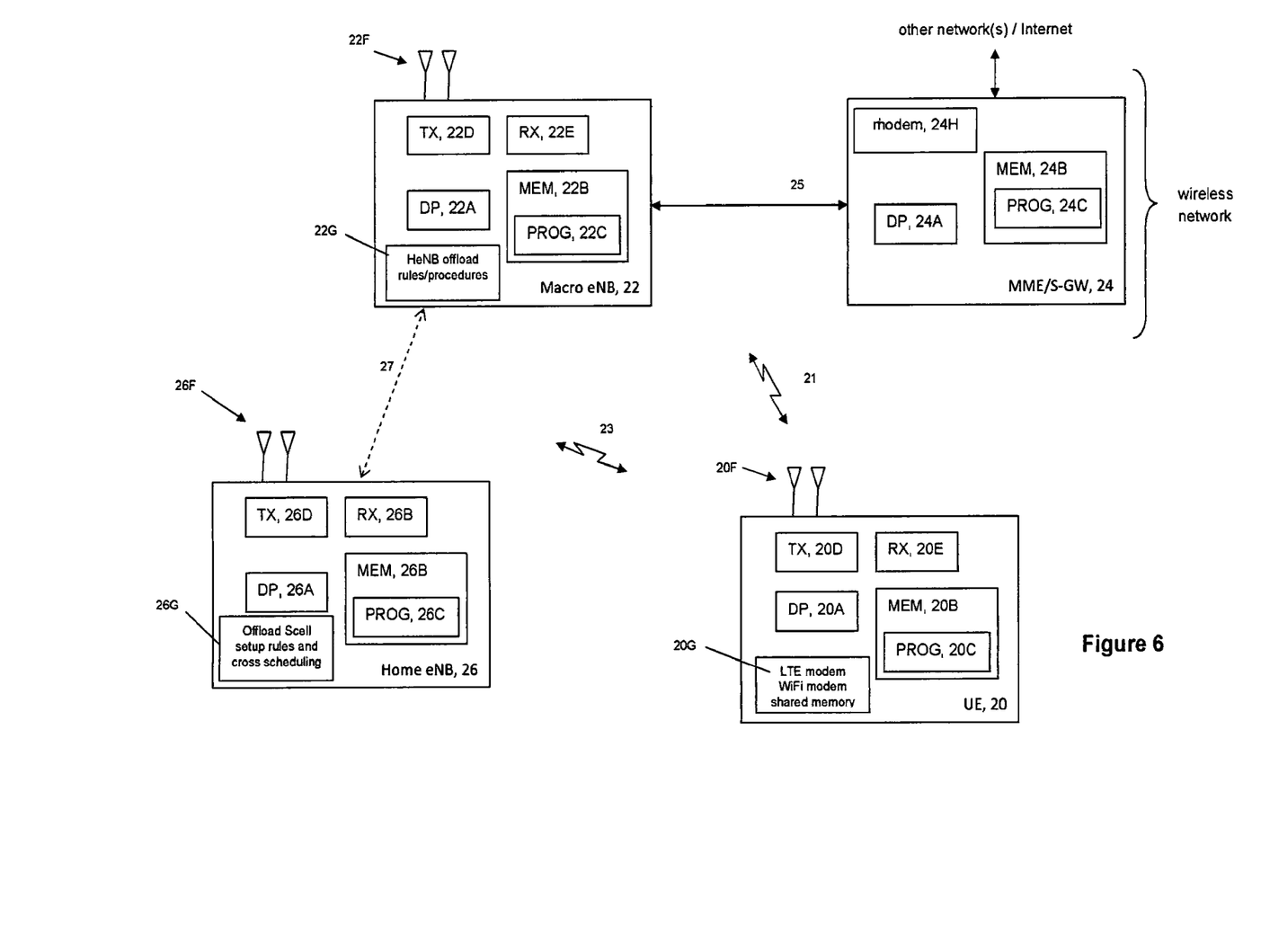
FIG. 6 is a simplified block diagram of a UE, a home eNB and a macro eNB with its associated higher network node, which are exemplary electronic devices suitable for use in practicing the exemplary embodiments of the invention.

Reference is now made to FIG. 6 for illustrating a simplified block diagram of various electronic devices and apparatus that are suitable for use in practicing the exemplary embodiments of this invention. In FIG. 6 a macro eNB 22 is adapted for communication over a licensed-band wireless link 21 with an apparatus, such as a mobile terminal or UE 20.

While the examples above were in the context of the LTE-A system, the eNB 22 may be any access node (including frequency selective repeaters) of any wireless network such as LTE, LTE-A, GSM, GERAN, WCDMA, and the like. The operator network of which the eNB 22 is a part may also include a network control element such as a mobility management entity MME and/or serving gateway SGW 24 or radio network controller RNC which provides connectivity with further networks (e.g., a publicly switched telephone network PSTN and/or a data communications network/Internet).

Normal DL traffic destined for the UE passes initially to the macro eNB 22 but in accordance with these embodiments at least some of that traffic is offloaded by the macro eNB 22 to the HeNB 26 for eventual wireless delivery to the UE 20 via the license-exempt band. UL traffic from the UE 20 is similarly offloaded to the license-exempt band and the UE sends this UL traffic to the HeNB 26 on the license-exempt band rather than to the macro eNB 22 on the LTE licensed band. It is the HeNB 26 which configures for the UE 20 the SCells, and which sends to the UE 20 on the (licensed band) PCell the cross scheduled (license-exempt band) SCell resources. While not particularly germane to the exemplary embodiments detailed herein, in some implementations this UL traffic may or may not pass also from the HeNB 26 to the macro eNB 22 depending on the HeNB's other network connections and/or the destination of that traffic, and/or it is possible that some of the offloaded DL traffic may be ported directly to the HeNB 26 without first passing through the macro eNB 22.

The UE 20 includes processing means such as at least one data processor (DP) 20A, storing means such as at least one computer-readable memory (MEM) 20B storing at least one computer program (PROG) 20C or other set of executable instructions, communicating means such as a transmitter TX 20D and a receiver RX 20E for bidirectional wireless communications with the eNodeB 22 via one or more antennas 20F. As noted above, it is advantageous if the UE 20 has dual transmit and receive chains, one each for the licensed and the license-exempt bands since traffic is offloaded but the UE 20 remains under control of the macro eNB 22 (and since it may be that still some traffic remains on the licensed band), but only one TX 20D and RX 20E are shown for clarity of illustration. There is also another block 20G representing the dual LTE modem and WiFi modem, and the shared memory for recording and reporting measurement reports as detailed above.

The eNB 22 also includes processing means such as at least one data processor (DP) 22A, storing means such as at least one computer-readable memory (MEM) 22B storing at least one computer program (PROG) 22C or other set of executable instructions, and communicating means such as a transmitter TX 22D and a receiver RX 22E for bidirectional wireless communications with the UE 20 via one or more antennas 22F. The eNB 22 stores at block 22G its offload to Home eNB rules/procedures if such offload is implemented in LTE network, and possibly also the macro eNB 22 may track at leave the traffic volume which is being offloaded so it may continue or discontinue traffic offloading as detailed herein as network conditions on the licensed band changes.

Similar to the eNB 22 but typically operating at a much reduced transmit power level (e.g., up to 2 watts for a HeNB versus a low of about 5 watts for a macro eNB), the HeNB 26 also includes processing means such as at least one data processor (DP) 26A, storing means such as at least one computer-readable memory (MEM) 26B storing at least one computer program (PROG) 26C or other set of executable instructions, and communicating means such as a transmitter TX 26D and a receiver RX 26E for bidirectional wireless communications on license-exempt channels with the UE 20 via one or more antennas 26F. The HeNB 26 carries out SCell setup rules/procedures as detailed above and the cross scheduling rules for cross scheduling on the license-exempt SCell from the licensed PCell as variously described in the embodiments above. There is also a control and data link 25 between the eNB 22 and the MME/S-GW 24, and there may be an additional control link 27 between the eNB 22 and the HeNB 26.

While not particularly illustrated for the eNB 22 or HeNB 26, those devices are also assumed to include as part of their wireless communicating means a modem and/or a chipset which may or may not be inbuilt onto an RF front end chip within those devices 22, 26 and which also operates utilizing the cross-scheduling rules according to these teachings.

At least one of the PROGs 20C in the UE 20 is assumed to include a set of program instructions that, when executed by the associated DP 20A, enable the device to operate in accordance with the exemplary embodiments of this invention, as detailed above. The eNB 22 and the HeNB 26 also have software stored in their respective MEMs 22B, 26B to implement certain aspects of these teachings. In these regards the exemplary embodiments of this invention may be implemented at least in part by computer software stored on the MEM 20B, 22B, 26B which is executable by the DP 20A of the UE 20 and/or by the DP 22A, 26A of the eNB 22 and HeNB 26 respectively, or by hardware, or by a combination of tangibly stored software and hardware (and tangibly stored firmware). Electronic devices implementing these aspects of the invention need not be the entire devices as depicted at FIG. 5 or may be one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A system, as noted above the exemplary embodiments of this invention may be used with various other CA-type wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus for use in controlling an access node, said apparatus comprising a processing system arranged to:
   utilize radio resource control signaling to configure a user device for N secondary cells on license-exempt channels $w_i$ in a frequency hopping channel set $W=\{w_i\}$ where i=1, 2, ... N, in which N is an integer at least equal to one and each license-exempt channel $w_i$ represents a number of one or multiple equal-bandwidth channels where the number is configurable by the access node per secondary cell;
   utilize cross-carrier scheduling on a primary cell to schedule a frequency hopping resource block $h_i$ on the $i^{th}$ license-exempt channel $w_i$ on at least one of the N secondary cells; and
   adapt parameters for the frequency hopping based on measurements of at least some of the license-exempt channels $w_i$ received from at least the user device.

2. The apparatus according to claim 1, in which:
   the frequency hopping resource block $h_i$ contains M physical resource blocks, scheduled for the at least one of the N secondary cells during a frequency hopping time interval $T_{u*L+j}$ by a downlink resource grant and an uplink resource grant sent on a physical downlink control channel PDCCH of the primary cell, in which M is an integer at least equal to one, u identifies one pattern for the frequency hopping, and j indicates a $j^{th}$ frequency hopping time interval within the pattern.

3. The apparatus according to claim 1, in which the radio resource control signaling to configure the N secondary cells on the license-exempt channels is sent by a micro access node on the primary cell by means of cross carrier scheduling, and the primary cell lies within a licensed frequency band.

4. The apparatus according to claim 1, in which there are a total of K equal-bandwidth license-exempt channels parsed into a frequency hopping channel set size N; and further
   for the case that N=K, each SCell occupies only one of the license-exempt channels $w_i$; and
   for the case that N<K, at least one SCell occupies more than one of the license-exempt channels $w_i$.

5. The apparatus according to claim 1, in which the radio resource control signaling further comprises an indication of a frequency hopping time interval T which is an integer multiple of subframes or radio frames used in the primary cell.

6. The apparatus according to claim 1, in which at least one of:
   the measurements of at least some of the license-exempt channels $w_i$ received from at least the user device comprise measurement reports received via radio resource control signaling, and the parameters for the frequency hopping are adapted by changing a number M of physical resource blocks allocated to an $i^{th}$ frequency hopping resource block $h_i$ based on whether the received measurement reports indicate a weak beacon, a strong beacon, or no beacon; and
   the measurements of at least some of the license-exempt channels $w_i$ received from at least the user device comprise acknowledgements/negative acknowledgements received via at least some of the license-exempt channels $w_i$, and the parameters for the frequency hopping are adapted by changing a number M of physical resource blocks allocated to an $i^{th}$ frequency hopping resource block $h_i$ based on whether a rate of the received acknowledgements/negative acknowledgements indicate poor channel quality, good channel quality or average channel quality.

7. The apparatus according to claim 6, in which the parameters for the frequency hopping are adapted by changing the number of license-exempt channels $w_i$ in the frequency hopping channel set $W=\{w_i\}$ by:
   explicitly updating the license-exempt channels $w_i$ in the frequency hopping channel set $W=\{w_i\}$ for all user devices configured on the at least one of the N secondary cells, for the case that multiple reports are received which indicate a strong beacon from another access point.

8. The apparatus according to claim 6, in which the parameters for the frequency hopping are adapted by changing the number of license-exempt channels $w_i$ in the frequency hopping channel set $W=\{w_i\}$ by:
   implicitly disabling for the user device the $i^{th}$ license-exempt channel $w_i$ by not further scheduling uplink or downlink grants for the user device on the $i^{th}$ license-exempt channel $w_i$, for the case that the user device reports a strong beacon on an $i^{th}$ license-exempt channel $w_i$.

9. The apparatus according to claim 1, in which the apparatus comprises a micro eNB operating on the primary cell in an LTE system and on the N secondary cells in a WLAN system.

10. The apparatus according to claim 1, wherein said processing system comprises at least one processor and a memory storing a set of computer instructions.

11. A method of controlling an access node, said method comprising:
    utilizing radio resource control signaling to configure a user device for N secondary cells on license-exempt channels $w_i$ in a frequency hopping channel set $W=\{w_i\}$ where i=1, 2, ... N, in which N is an integer at least equal to one and each license-exempt channel $w_i$ represents a number of one or multiple equal-bandwidth channels where the number is configurable by the access node per secondary cell;
    utilizing cross-carrier scheduling on a primary cell to schedule a frequency hopping resource block $h_i$ on the $i^{th}$ license-exempt channel $w_i$ on at least one of the N secondary cells; and
    adapting parameters for the frequency hopping based on measurements of at least some of the license-exempt channels $w_i$ received from at least the user device.

12. The method according to claim 11, in which:
    the frequency hopping resource block $h_i$ contains M physical resource blocks, scheduled for the at least one of the N secondary cells during a frequency hopping time interval $T_{u*L+j}$ by a downlink resource grant and an uplink resource grant sent on a physical downlink control channel PDCCH of the primary cell, in which M is an integer at least equal to one, u identifies one pattern for the frequency hopping, and j indicates a $j^{th}$ frequency hopping time interval within the pattern.

13. The method according to claim 11, in which the radio resource control signaling to configure the N secondary cells on the license-exempt channels is sent by a micro access node by means of cross carrier scheduling, and the primary cell lies within a licensed frequency band.

14. The method according to claim 11, in which there are a total of K equal-bandwidth license-exempt channels parsed into a frequency hopping channel set size N; and further
    for the case that N=K, each SCell occupies only one of the license-exempt channels $w_i$; and
    for the case that N<K, at least one SCell occupies more than one of the license-exempt channels $w_i$.

15. The method according to claim 11, in which the radio resource control signaling further comprises an indication of a frequency hopping time interval T which is an integer multiple of subframes or radio frames used in the primary cell.

16. The method according to claim 11, in which at least one of:
the measurements of at least some of the license-exempt channels $w_i$ received from at least the user device comprise measurement reports received via radio resource control signaling, and the parameters for the frequency hopping are adapted by changing a number M of physical resource blocks allocated to an $i^{th}$ frequency hopping resource block $h_i$ based on whether the received measurement reports indicate a weak beacon, a strong beacon, or no beacon; and
the measurements of at least some of the license-exempt channels $w_i$ received from at least the user device comprise acknowledgements/negative acknowledgements received via at least some of the license-exempt channels $w_i$, and the parameters for the frequency hopping are adapted by changing a number M of physical resource blocks allocated to an $i^{th}$ frequency hopping resource block $h_i$ based on whether a rate of the received acknowledgements/negative acknowledgements indicate poor channel quality, good channel quality or average channel quality.

17. The method according to claim 16, in which the parameters for the frequency hopping are adapted by changing the number of license-exempt channels $w_i$ in the frequency hopping channel set W={$w_i$} by:
explicitly updating the license-exempt channels $w_i$ in the frequency hopping channel set W={$w_i$} for all user devices configured on the at least one of the N secondary cells, for the case that multiple reports are received which indicate a strong beacon from another access point.

18. The method according to claim 16, in which the parameters for the frequency hopping are adapted by changing the number of license-exempt channels $w_i$ in the frequency hopping channel set W={$w_i$} by:
implicitly disabling for the user device the $i^{th}$ license-exempt channel $w_i$ by not further scheduling uplink or downlink grants for the user device on the $i^{th}$ license-exempt channel $w_i$, for the case that the user device reports a strong beacon on an $i^{th}$ license-exempt channel $w_i$.

19. The method according to claim 11, in which the method is executed by a micro eNB operating on the primary cell in an LTE system and on the N secondary cells in a WLAN system.

20. A computer readable memory storing a set of instructions, which when executed by an apparatus for use in controlling an access node causes the apparatus to:
utilize radio resource control signaling to configure a user device for N secondary cells on license-exempt channels $w_i$ in a frequency hopping channel set W={$w_i$} where i=1, 2, ... N, in which N is an integer at least equal to one and each license-exempt channel $w_i$ represents a number of one or multiple equal-bandwidth channels where the number is configurable by the access node per secondary cell;
utilize cross-carrier scheduling on a primary cell to schedule a frequency hopping resource block $h_i$ on the $i^{th}$ license-exempt channel $w_i$ on at least one of the N secondary cells; and
adapt parameters for the frequency hopping based on measurements of at least some of the license-exempt channels $w_i$ received from at least the user device.

21. The computer readable memory according to claim 20, in which:
the frequency hopping resource block $h_i$ contains M physical resource blocks, scheduled for the at least one of the N secondary cells during a frequency hopping time interval $T_{u*L+j}$ by a downlink resource grant and an uplink resource grant sent on a physical downlink control channel PDCCH of the primary cell, in which M is an integer at least equal to one, u identifies one pattern for the frequency hopping, and j indicates a $j^{th}$ frequency hopping time interval within the pattern.

* * * * *